(12) United States Patent
Kulshreshtha et al.

(10) Patent No.: US 12,418,568 B2
(45) Date of Patent: Sep. 16, 2025

(54) SYSTEMS AND METHODS FOR APPLICATION CLUSTERING BASED ON INCLUDED LIBRARIES AND OBSERVED EVENTS

(71) Applicant: Cisco Technology, Inc., San Jose, CA (US)

(72) Inventors: Ashutosh Kulshreshtha, Cupertino, CA (US); Dhruv Raithatha, San Francisco, CA (US); Walter T. Hulick, Jr., Pearland, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 332 days.

(21) Appl. No.: 17/752,987

(22) Filed: May 25, 2022

(65) Prior Publication Data

US 2023/0388346 A1    Nov. 30, 2023

(51) Int. Cl.
```
G06F 7/04        (2006.01)
G06F 15/16       (2006.01)
G06F 18/23213    (2023.01)
H04L 9/40        (2022.01)
H04L 29/06       (2006.01)
```
(52) U.S. Cl.
CPC ........ *H04L 63/20* (2013.01); *G06F 18/23213* (2023.01); *H04L 63/1433* (2013.01)

(58) Field of Classification Search
CPC ................. H04L 63/20; H04L 63/1433; G06F 18/23213; G06K 9/6223
USPC .......................................................... 726/4
See application file for complete search history.

(56) References Cited

U.S. PATENT DOCUMENTS

| | | |
|---|---|---|
| 9,846,772 B1 | 12/2017 | Satish |
| 2016/0094406 A1 | 3/2016 | Phan et al. |
| 2016/0277525 A1 | 9/2016 | Porat |
| 2016/0294728 A1* | 10/2016 | Jain ..................... H04L 41/5051 |
| 2019/0102155 A1* | 4/2019 | Garvey ..................... G06F 8/60 |
| 2019/0306178 A1 | 10/2019 | Weizman et al. |
| 2020/0328978 A1* | 10/2020 | Gupta .................. H04L 45/306 |
| 2021/0320912 A1 | 10/2021 | Kunjuraman Pillai et al. |

(Continued)

OTHER PUBLICATIONS

International Search Report and Written Opinion for International Application No. PCT/US2023/022210, mailed Aug. 7, 2023, 14 Pages.

(Continued)

*Primary Examiner* — Jeffrey C Pwu
*Assistant Examiner* — Samuel Ambaye
(74) *Attorney, Agent, or Firm* — Baker Botts L.L.P.

(57) ABSTRACT

A system of one embodiment that provides proactive security policy suggestions for applications based on the applications' software composition and runtime behavior. The system includes a memory and a processor. The system is operable to access data that represents one or more features of an application. The application is running on one or more nodes in a computer network, and a feature indicates an application library of the node. The system is operable to apply a clustering algorithm to the data to generate a plurality of cluster sets. The system is operable to determine a security policy to apply to a cluster set of the plurality of cluster sets and apply the security policy to an application whose features are represented by the data in the cluster set.

14 Claims, 6 Drawing Sheets

(56) References Cited

U.S. PATENT DOCUMENTS

2021/0385253 A1* 12/2021 Shivamoggi ........ H04L 63/1408
2022/0247786 A1* 8/2022 Vavilala ................. G06N 20/00

OTHER PUBLICATIONS

Zhang Y., et al., "Detecting Third-Party Libraries in Android Applications with High Precision and Recall", 2018 IEEE 25th International Conference on Software Analysis, Evolution and Reengineering (SANER), IEEE, Mar. 20, 2018, pp. 141-152, XP033343004, DOI: 10.1109/SANER.2018.8330204 [retrieved on Apr. 2, 2018], Abstract, Introduction, Sections II-IV.

* cited by examiner

SYSTEMS AND METHODS FOR APPLICATION CLUSTERING BASED ON INCLUDED LIBRARIES AND OBSERVED EVENTS

TECHNICAL FIELD

The present disclosure relates generally to communication networks, and more specifically to systems and methods for application clustering based on included libraries and observed events.

BACKGROUND

Over the past decades, an increasing number of computer software applications have been deployed to run on computer networks. At the same time, the increasing number of computer software applications that have been deployed to run on computer networks have faced more security vulnerabilities. Maintaining the security of computer software applications running on computer networks presents challenges for the development teams that deploy them and the security operations teams that ensure the security of the computer software applications.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

According to one embodiment of the present disclosure, a system provides proactive security policy suggestions for applications based on the applications' software composition and runtime behavior. The system includes a memory and a processor. The system is operable to access data that represents one or more features of an application. The application is running on one or more nodes in a computer network. The system is operable to apply a clustering algorithm to the data to generate a plurality of cluster sets. The system is operable to determine a security policy to apply to a cluster set of the plurality of cluster sets and apply the security policy to an application whose features are represented by the data in the cluster set.

According to one embodiment of the present disclosure, a method comprises accessing data that represents one or more features of an application. The application is running on one or more nodes in a computer network. The method further comprises applying a clustering algorithm to the data to generate a plurality of cluster sets. The method further comprises determining a security policy to apply to a cluster set of the plurality of cluster sets. The method further comprises applying the security policy to an application whose features are represented by the data in the cluster set.

Certain embodiments of the disclosure may provide one or more technical advantages. A technical advantage of one embodiment may allow for improved productivity by allowing security operations teams to scale their effort in creating security policies for applications. Certain embodiments may automatically suggest or apply new security policies for new applications that are added to a computer network. Some embodiments may allow for the easier security protection of critical enterprise networks and systems by allowing for the quick deployment of security policies to applications running on those networks and systems. One or more other technical advantages may be readily apparent to one skilled in the art from the figures, descriptions, and claims included herein.

Example Embodiments

In a computer network, it can be overwhelming for security operations (SecOps) teams to create meaningful security policies for applications and tiers of applications running on nodes in the computer network because of how many new applications are being added and deployed on the computer network. Even when well-staffed SecOps teams do exist, the amount of time to create effective security policies for new applications or tiers of applications can be massive. Despite all of this effort, using humans to create security policies for applications is error prone because it does not involve analyzing the service behavior at runtime. Instead, it is a best guess effort based on a SecOps team's understanding of how everything works. It also requires a high amount of skill and has obvious difficulties with scaling as development teams scale up.

The present disclosure describes embodiments that are directed to providing a solution to the above problems by using machine learning to automatically suggest security policies for new applications based on their included software libraries and runtime behavior. The present disclosure solves many of the issues of relying solely on SecOps personnel to implement security policies for new applications and tiers of applications added to a network. The present disclosure provides systems and methods that help scale the effort of SecOps personnel when they spend their time and expertise to create a security policy to improve an existing tier of applications. In some embodiments, the present disclosure may collect information regarding all the software libraries and packages used by an application running on anode in a network. It also observes all interesting events that anode running an application does at runtime (e.g., network access, file access) and assess the runtime behavior of the application. Additionally, it also provides an ability to create runtime security policies that improve the security posture of an application.

In some embodiments, the solution uses machine learning algorithms like K-means clustering, mean-shift clustering, density-based spatial clustering, to cluster any new applications by observing its behavior in the Continuous Integration and Continuous Delivery (CI/CD) pipeline. Based on the similarity it has to the other clusters, it suggests what security policies from any existing tiers can be applied to the new tier. This suggestion is based on machine learning algorithms, so unlike traditional cases, the more applications that are added to a network, the better the network becomes at identifying the correct cluster and proactively suggesting the correct policies to help secure any new applications.

Figure 1A:
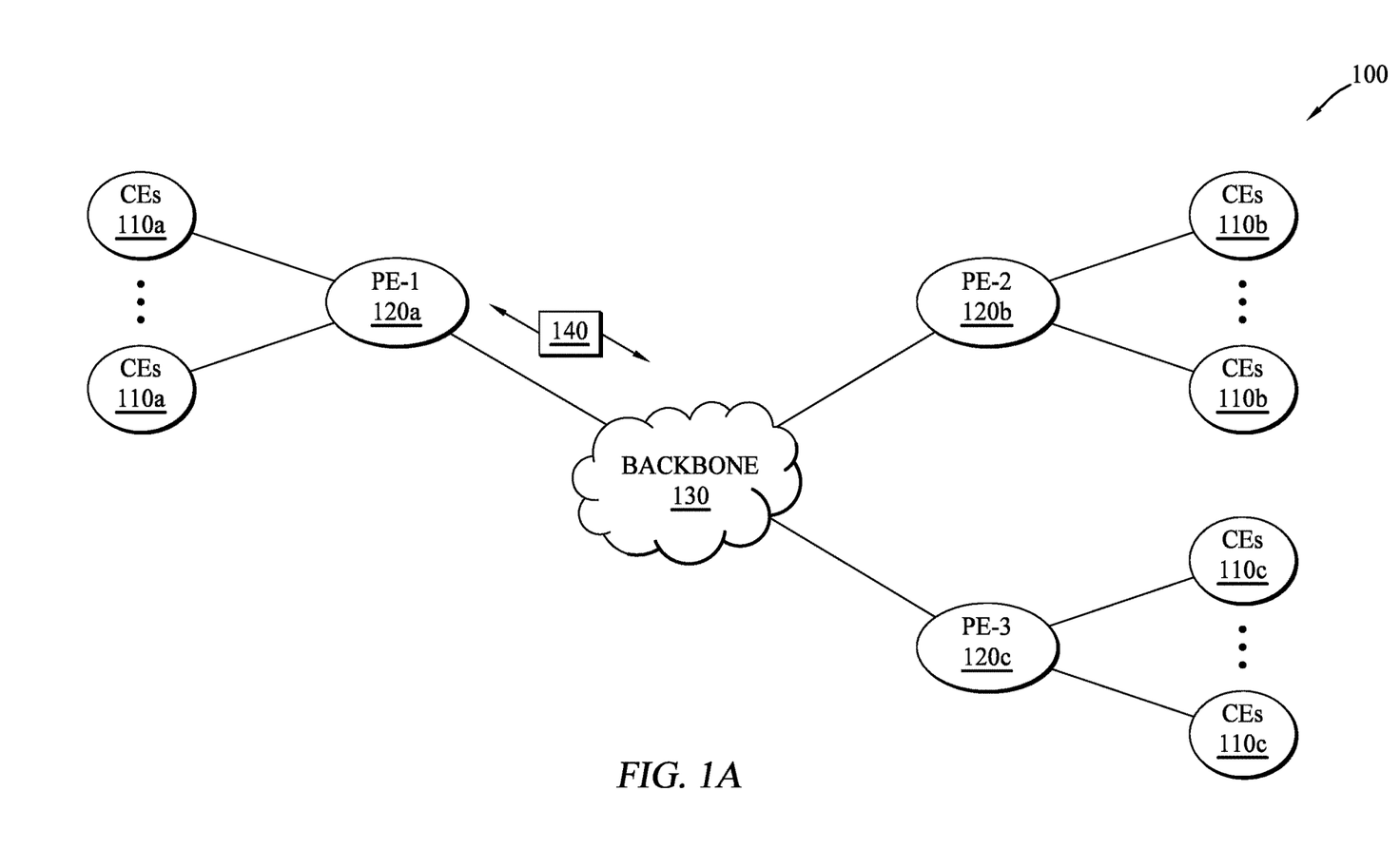
FIGS. 1A-1B illustrate an example computer network that provides proactive security policy suggestions for applications based on the applications' software composition and runtime behavior.

FIG. 1A is a schematic block diagram of an example computer network 100 that provides proactive security policy suggestions for applications running on nodes in computer network 100 based on an application's software composition and runtime behavior. In the illustrated embodiment, network 100 comprises nodes/devices, such as a plurality of routers/devices interconnected by links or networks, as shown. Customer edge (CE) routers 110 may be interconnected with provider edge (PE) routers 120 (e.g., PE-1, PE-2, and PE-3) in order to communicate across a core network, such as a network backbone 130.

Routers 110, 120 represent any suitable network device that facilitates communication between endpoints through a network. Routers 110, 120 may include edge routers, core routers, virtual routers, backbone routers, enterprise routers, access routers, border routers, provider edge routers, and intermediate node routers, or the like. Routers 110, 120 may be interconnected by the public Internet, a multiprotocol label switching (MPLS) virtual private network (VPN), Software-Defined Wide Area Network (SD-WAN), or the like.

Provider edge routers 120 represent any suitable network device that facilitates communication between one network service provider's area and areas administered by other network service providers. Provider edge routers 120 may include edge routers and border routers. For example, provider edge routers 120 may facilitate communication between two different internet service providers. Customer edge routers 110 represent any suitable network device that facilitates communication between a customer's network and a network service provider's network. For example, customer edge routers 110 may include an edge router that is located on a customer's premises that provides an ethernet interface between the customer's LAN and the network service provider's core network.

Backbone 130 represents any suitable network device or group of devices that provides connectivity between network devices located in different geographical areas and/or different types of local networks. Backbone 130 may include backbone routers and core routers that facilitate the routing of data across backbone 130. In some embodiments, backbone 130 may be operated by an internet service provider. In some embodiments, backbone 130 is operated by a single organization within a single network. In some embodiments, backbone 130 may comprise the public Internet.

Data packets 140 represent traffic or messages that may be exchanged among the nodes/devices of computer network 100. Data packets 140 may be exchanged over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol.

In an exemplary embodiment of operation, first customer edge router 110a receives data packet 140 from a node in a first network of computer network 100. For example, the first network may be located in Dallas, TX. The node in the first network may be running an application and the data packet 140 that this node sent may include data regarding at least the included libraries and observed events of the application(s) running on the node. First customer edge router 110a then routes data packet 140 to a first provider edge router 120a using a TCP/IP protocol. Upon receiving data packet 140, first provider edge router 120a then routes data packet 140 across backbone 130 to a second provider edge router 120b in a second network of computer network 100. For example, the second network could be in Washington, D.C. Then the provider edge router 120b may route the data packet 140 to a second node in the second network. The second node may receive data packet 140. The second node may use an application monitoring process to process the data regarding the included libraries and observed events of the application running on the node in the first network. Upon processing the data, the node in the second network is automatically able to cluster that application with other applications on computer network 100 and then apply or suggest security policies for that application. Alternatively, first provider edge router 120a then routes data packet 140 across backbone 130 to a third provider edge router 120c in a third network in computer network 100. Upon receiving data packet 140, second provider edge router 120b routes data packet 140 to a second customer edge router 110b in the second network. Second customer edge router 110b then routes data packet 140 to a node in the second network.

Modifications, additions, or omissions may be made to computer network 100 without departing from the scope of the disclosure. For example, any number of routers 110, 120 can be included in computer network 100. As another example, data packet 140 can be communicated across computer network 100 using one or more protocols, such as the TCP/IP protocol, HTTP protocol, UDP protocol, and any other known protocol. As another example, computer network 100 may be composed of any number of networks.

Figure 1B:
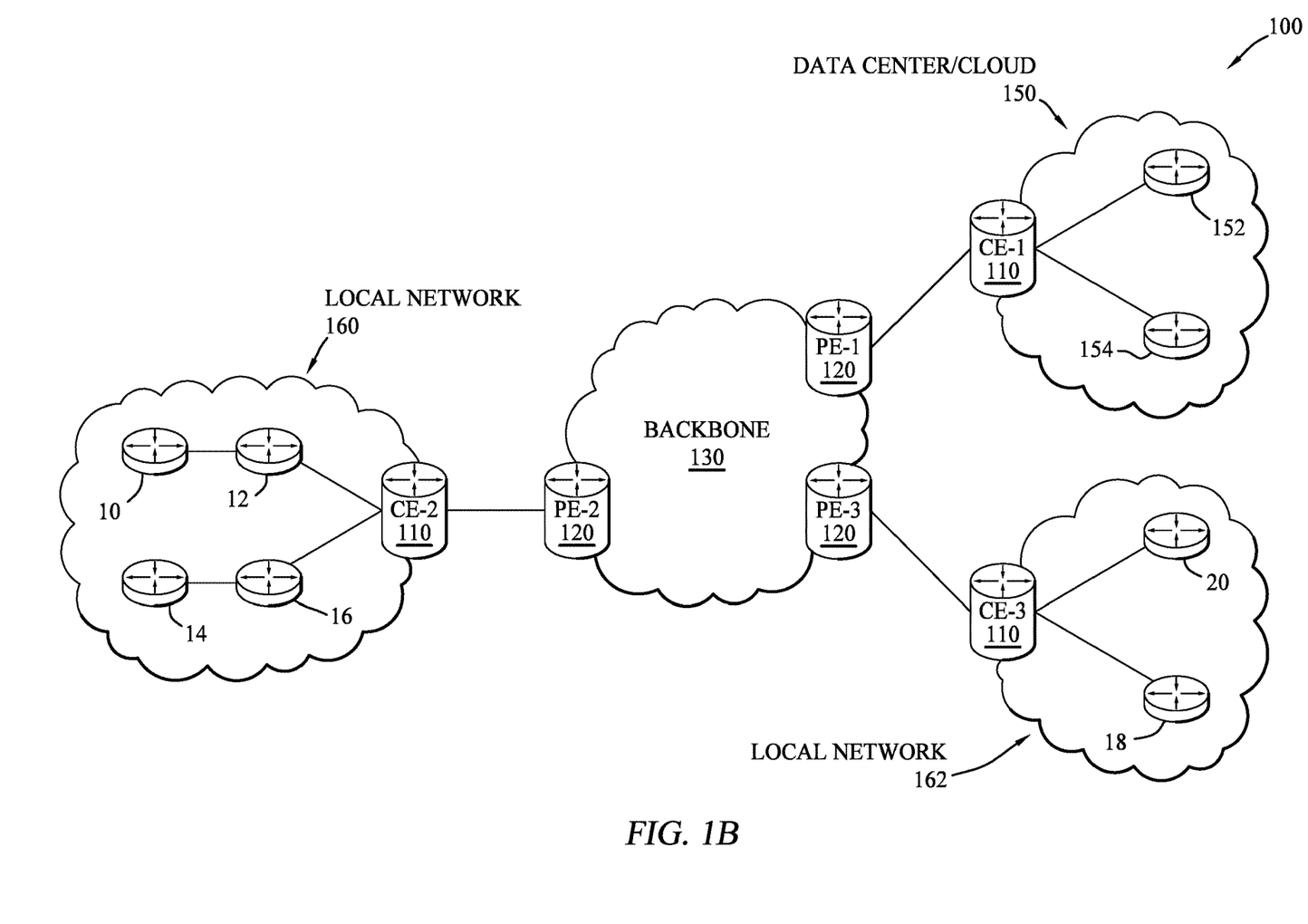

In some implementations, a router or a set of routers may be connected to a private network (e.g., dedicated leased lines, an optical network, etc.) or a virtual private network (VPN), such as an MPLS VPN linked to a carrier network, via one or more links exhibiting different network and service level agreement characteristics FIG. 1B is a schematic block diagram of example computer network 100 that provides proactive security policy suggestions for applications running on nodes in computer network 100 based on an application's software composition and runtime behavior. In the illustrated embodiment, computer network 100 is shown in greater detail, according to various embodiments. As shown, network backbone 130 may provide connectivity between devices located in different geographical areas and/or different types of local networks. For example, computer network 100 may comprise local/branch networks 160, 162 that include nodes 10-16 and nodes 18-20, respectively, as well as a data center/cloud environment 150 that includes servers 152-154. Notably, local networks 160-162 and data center/cloud environment 150 may be located in different geographic locations. As would be appreciated, computer network 100 may include any number of local networks, data centers, cloud environments, devices/nodes, servers, etc.

Local networks 160, 162 represent any suitable computer network that interconnects any number of devices and nodes in a limited area. Local networks 160, 162 may include local area networks (LANs), wired LANs, wireless LANs, virtual LANs, Metropolitan Area Networks (MANs), ethernet networks, token ring networks, token bus networks, and fiber distributed data interfaces. Local networks 160, 162 may comprise cables, access points, switches, routers, or any suitable device or component that enables nodes 10-16 to interconnect with each other or internal servers, web servers or other networks. In some embodiments, local networks 160, 162 may be client/server LANs. In some embodiments, local networks 160,162 may be peer-to-peer LANs.

Nodes 10-20 represent any suitable device that is capable of connecting to a local network such as local network 160, 162. Nodes 10-20 may include routers, servers, end-user devices such as laptops, phones, tablets, and any other suitable device capable of connecting to a local network. Nodes 10-20 may comprise one or more network interfaces, at least one processor, and a memory that is interconnected by a system bus as well as a power supply. In some embodiments, nodes 10-20 represent devices that are capable of running an application or groups of applications on computer network 100.

Data center/cloud 150 is a network of computing and storage resources that facilitates providing proactive security policy suggestions for applications running on nodes in computer network 100 based on an application's software composition and runtime behavior. Data center/cloud 150 may include a colocation data center, enterprise data center, cloud data center, edge data center, and micro data center.

Servers 152-154 represent any suitable device that is capable of serving and/or receiving content using any internetworking protocol to any number of devices on computer network 100. Servers 152-154 may include web servers, database servers, email servers, web proxy servers, DNS servers, FTP servers, file servers, virtual servers, application servers, and DHCP servers. In some embodiments, servers 152-154 may represent the cloud-based resources of network 100. Servers 152-154 may comprise one or more network interfaces, at least one processor, and memory that is interconnected by a system bus as well as a power supply. Servers 152-154 may include, in various embodiments, any number of suitable servers or other cloud-based resources.

In an exemplary embodiment of operation, an application running on node 12 sends a data packet to customer edge router CE-2 110. The data packet is received by customer edge router CE-2 110 from node 12 in local network 160. For example, local network 160 may be located in Dallas, TX. Customer edge router CE-2 110 then routes the data packet to provider edge router PE-2 120 using a TCP/IP protocol. Upon receiving data packet, provider edge router PE-2 120 then routes the data packet across backbone 130 to provider edge router PE-1 120 in data center/cloud 150. For example, the data center/cloud could be in Washington, D.C. Upon receiving the data packet, provider edge router PE-1 120 routes data packet to customer edge router CE-1 110 in the data center/cloud. Customer edge router CE-1 110 then routes the data packet to server 152. Upon receiving the data packet, server 152 facilitates providing proactive security policy suggestions for applications running on nodes/devices in computer 100. Alternatively, provider edge router PE-2 120 then routes the data packet across backbone 130 to provider edge router PE-3 120 in local network 162. Upon receiving the data packet, provider edge router PE-3 120 routes data packet to customer edge router CE-3 110 in local network 162. Customer edge router CE-3 110 then routes the data packet to one of nodes 18-20. Upon receiving the data packet, nodes 18-20 facilitates providing proactive security policy suggestions for applications running on nodes/devices in computer network 100.

Modifications, additions, or omissions may be made to computer network 100 without departing from the scope of the disclosure. For example, any number of nodes 10-20 may be included in computer network 100. As another example, servers 152-154 may also serve as nodes in computer network 100. As another example, computer network 100 may be composed of any number of networks or data center/clouds.

In some embodiments, the techniques herein may be applied to other network topologies and configurations. For example, the techniques herein may be applied to peering points with high-speed links, data centers, etc. Furthermore, in various embodiments, computer network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to is connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
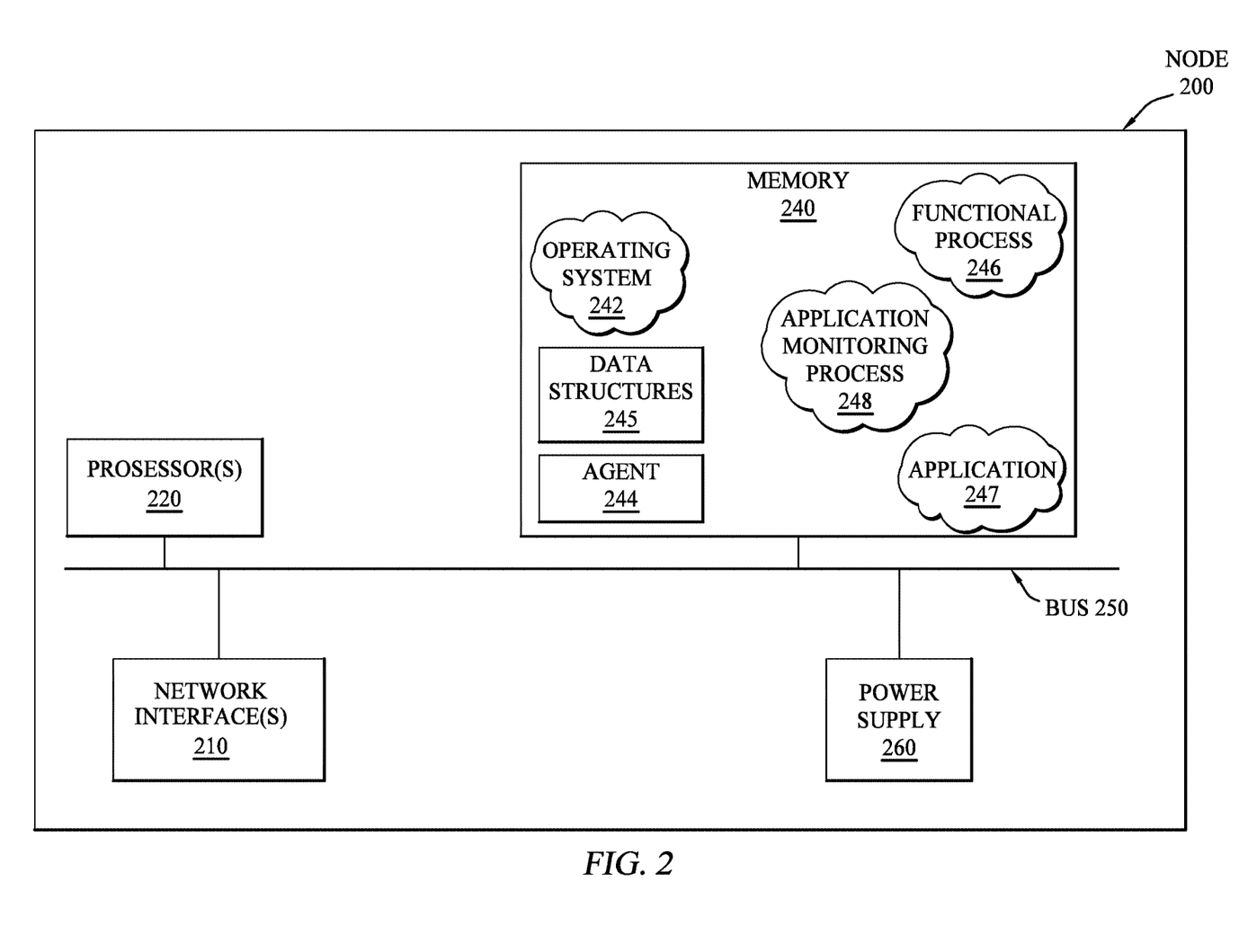
FIG. 2 is a schematic block diagram of an example computing node for clustering applications based on included libraries and observed events.

Notably, shared-media mesh networks, such as wireless networks, are often on what is referred to as Low-Power and Lossy Networks (LLNs), which are a class of networks in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 110 operates as a root node for nodes/devices 10-16 in the local mesh, in some embodiments FIG. 2 is a schematic block diagram of an example computing node 200 for clustering applications based on included libraries and observed events that may be used with one or more embodiments described herein, e.g., as any of the devices shown in FIGS. 1A-1B above. The device may include one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 represent the component of node 200 that contains the mechanical, electrical, and signaling circuitry for communicating data over links coupled to the computer network 100, e.g., providing a data connection between node 200 and the data network, such as the Internet. Network interfaces 210 may be configured to transmit and/or receive data using a variety of different communication protocols. For example, network interfaces 210 may include wired transceivers, wireless transceivers, cellular transceivers, or the like, each to allow node 200 to communicate information to and from a remote computing device or server over an appropriate network. The same network interfaces 210 also allow communities of multiple nodes 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (PoE), network interface 210 may communicate through power supply 260 or may be an integral component of the power supply.

Processor 220 represents a component of node 200 that executes instructions, such as computer programs, and communicatively couples network interface(s) 210 and memory 240. Processor 220 includes any hardware and software that operates to control and process information. Processor 220 may be a programmable logic device, a microcontroller, a microprocessor, any suitable processing device, or any suitable combination of the preceding. The processor 220 may comprise hardware elements or hardware logic adapted to execute the software programs and manipulate the data structures 245.

Memory 240 represents a component in node 200 that comprises a plurality of storage locations that are addressable by the processor 220 and network interfaces 210 for storing software programs and data structures associated with the embodiments described herein. For example, memory 240 may include RAM, ROM, flash memory, magnetic storage devices, optical storage devices, network storage devices, cloud storage devices, solid-state devices, or any other suitable information storage device or a combination of these devices. Memory 240 may store information in one or more databases, file systems, tree structures, any other suitable storage system, or any combination thereof. Furthermore, different information stored in memory 240 may use any of these storage systems. Moreover, any information stored in memory 240 may be encrypted or unencrypted, compressed or uncompressed, and static or editable.

Operating system 242, portions of which are typically resident in memory 240 and executed by the processor 220, functionally organizes the device by, among other things, invoking operations in support of software processes and/or services executing on the device. For example, operating system 242 may include any suitable operating system such as Cisco IOS, MS DOS, PC-DOS, MAC-OS, WINDOWS, UNIX, OpenVMS, Linux, or any other appropriate operating system, including future operating systems.

The software processes and/or services that operating system 242 executes may include one or more functional processes 246, one or more applications 247, and an application monitoring process 248, as described herein. Functional processes 246, when executed by processor(s) 220, cause each particular node 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

Application(s) 247, when executed by processor(s) 220, cause each particular node 200 to perform various functions. For example, application 247 may include applications that are written in Java, PHP, .Net, Node.JS, and any other application programming language that may be suitable to run on node 200. Many applications are written in Java.

In certain embodiments, memory 240 further comprises one or more agents 244 deployed to monitor applications 247, functional processes 246, or any other aspect of node 200 including but not limited to network interface 210, processor 220, or power supply 260. Agent 244 represents any suitable software process or service that, when executed by processor(s) 220, monitors, collects, and reports data on application(s) running on node 200. Any of the agents 244 may be implemented as different types of agents with specific monitoring duties. For example, application agents may be installed on each node 200 that hosts applications to be monitored. In certain embodiments, agent 244 may be added into the runtime process of application 247. In certain embodiments, agent 244 may be implemented in the byte code instrumentation of applications 247. In certain embodiments, agent 244 is configured to collect data from application 247 and report the information to application monitoring process 248. The data that agent 244 reports to the application monitoring process 248 may comprise information regarding application libraries loaded in memory 240 for individual runtimes of processes of applications 247. As would be apparent to a person skilled in the art, application libraries are collections of non-volatile resources used by an application and may comprise configuration data, documentation, help data, message templates, pre-written code and subroutines, classes, values or type specifications. For example, agent 244 may collect data that application 247 uses for login application library and then reports that data to application monitoring process 248.

Agent 244 may also collect and report events data from application 247 to application monitoring process 248. In certain embodiments, events data may include information regarding whether application 247 has connections to external IP addresses through functional process 246 and network interface 210. Events data may also comprise information regarding whether application 247 has connections to internal IP addresses through functional process 246 and network interface 210. In certain embodiments, events data comprises information regarding the number of connections to external and/or internal IP addresses and the average duration of such connections. Events data may also include data that an application is running on node 200. Events data may also include information that indicates that an application calls another application's application libraries.

In certain embodiments, agent 244 may collect and report data on a current security policy that is applied to application 247. As noted above, many applications are written in Java. Other popular languages include .NET and the like, many of which include an optional security manager. For example, the Java Security Manager is an optional module in the Java runtime that reviews permission requests from the Java runtime and compares the requests with a Java security policy, which may be loaded from file(s) and provides the mechanism used to determine whether a specific permission may be granted or denied. In cases in which a security manager, such as a Java Security Manager, is used by application 247, agent 244 will report the one or more security policies that have been implemented with the security manager on application 247 to application monitoring process 248. In certain embodiments, in cases in which a security manager has not been implemented on application 247, node 200 will install a custom security manager using the System.setSecurityManager(sm) call in Java (or equivalent in .NET or other language). In certain embodiments, agent 244 will report to application monitoring process 248 that no security policy has been applied to application 247. As an example, a policy may include a block command to block execution of an application associated with a high security risk.

Application monitoring process 248 represents any suitable software process or service that, when executed by processor(s) 220, causes node(s) 200 in the computer network 100 to perform certain security monitoring functions and processes in response to receiving data from agent(s) 244 and/or application(s) 247. In certain embodiments, application monitoring process 248 receives and/or accesses data from agent(s) 244 regarding one or more applications that are running on node(s) 200. As disclosed above, the data may include application library data, events data, and current security policies. Each data represents a feature of an application running on one or more nodes 200 in computer network 100. In certain embodiments, once application monitoring process 248 receives the data from one or more agents 244, application monitoring process 248 applies a machine learning clustering algorithm to the data to generate a plurality of cluster sets, as described in more detail below in FIG. 3. In certain embodiments, the machine learning clustering algorithm comprises one or more of the following algorithms to cluster the data: K-means clustering algorithm, means-shift clustering algorithm, and a density-based spatial clustering algorithm, and similar clustering algorithms. Once a plurality of cluster sets has been generated by the machine learning clustering algorithm, application monitoring process 248 may determine a security policy to apply to cluster set of the plurality of cluster sets. In certain embodiments, once a security policy has been determined by application monitoring process 248, application monitoring process 248 may apply the determined security policy to the security policy setting of the security manager of application(s) 247 of the one or more nodes 200 in computer network 100. In certain embodiments, application monitoring process 248 generates the cluster sets of data and applies security policies to applications automatically. For example, application monitoring process 248 may deduce that application 247 is a webserver, e.g., if it has a plurality of application libraries with connections to outside IP addresses (without having the firsthand knowledge that it is a webserver). Accordingly, once deduced, application monitoring process 248 may apply a webserver security policy to application 247. Applications 247 may be grouped into small, related groups so security policies relevant to the particular type of application may be applied to the group of applications.

In certain embodiments, application monitoring process 248 may further group the application(s) into tiers. For example, tiers may be categorized into shopping applications, bandwidth applications, etc. with various verifications. As another example, tiers may be categorized according to the level of security vulnerability. Each tier may access certain resources (such as database servers and/or other nodes). In certain embodiments, application monitoring process 248 may use this data to build a hierarchy for the end user so that the end user does not have to do this work, as described in more detail in FIG. 4.

Modifications, additions, or omissions may be made to node 200 without departing from the scope of the disclosure. For example, in certain embodiments, node 200 may also include a display communicatively coupled to processor 220 and a Graphical User Interface (GUI) generator software process that, when executed by processor(s) 220, causes processor 220 to transmit signals to the display that when received by the display cause it to present a graphical representation of the application clustering algorithm as disclosed and shown in FIGS. 3 and 4. The display is any device or component that is suitable to present a GUI to an end user. The display may include devices such as TVs, monitors, smart phones, computers, laptops, and other similar devices. As another example, in certain embodiments, agent 244 may not be a separate process and is instead apart of application 247.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
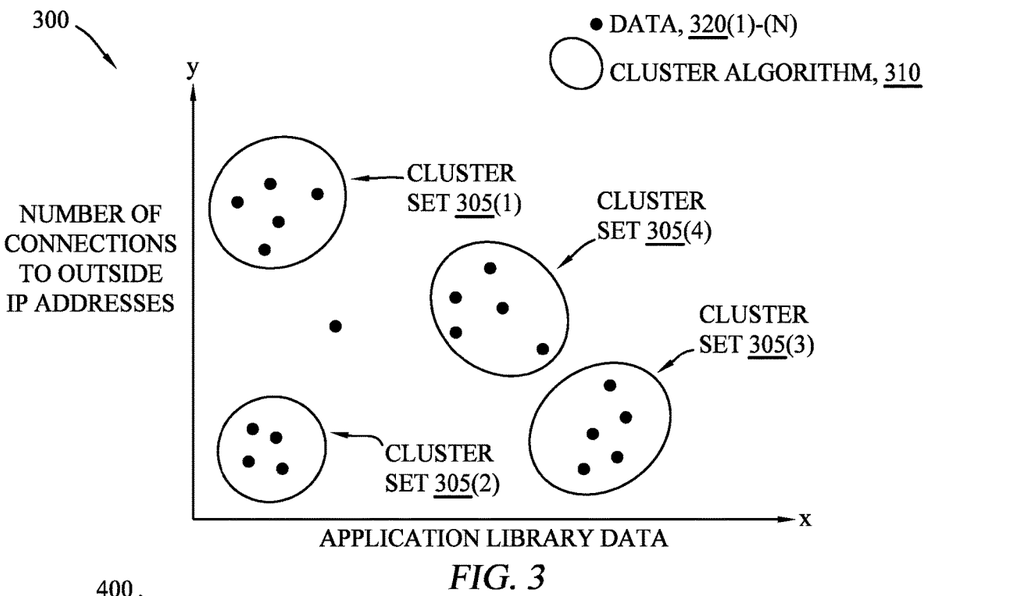
FIG. 3 is a schematic diagram illustratively depicting applying a clustering algorithm to the data and generating a plurality of cluster sets, according to one embodiment of the present disclosure.

FIG. 3 is a schematic diagram 300 illustratively depicting applying a clustering algorithm to the data and generating a plurality of cluster sets, according to one embodiment of the present disclosure. In the illustrated embodiment, schematic diagram 300 comprises data 320 that is processed by cluster algorithm 310 and then generates cluster sets 305. Any of the nodes 200 above may be capable of processing data 320 according to the disclosed embodiment of FIG. 3.

Data 320 represents a feature of an application running on one or more nodes 200 in the computer network 100. The data may include application library data, events data, and current security policies. In certain embodiments, the feature that the data represents may be transformed into a numerical value in order to be processed by the cluster algorithm 310. For example, if a feature of an application running on one or more nodes 200 in a computer network 100 includes an application library, the feature may need to be transformed into a numerical value such as the number of application libraries, the number of certain types of application libraries, hash values of application libraries, or any suitable numerical value for representing the data. In other embodiments, the application library feature or any other similar features of node 200 in computer network 100 does not need to be transformed to be processed by the cluster algorithm 310.

Cluster algorithm 310 represents any algorithm that is suitable to cluster data into at least one group based on the characteristics of the data. Cluster algorithm 310 may include K-means clustering algorithm, means-shift clustering algorithm, a density-based spatial clustering algorithm, centroid-based clustering algorithm, distribution-based clustering algorithms such as gaussian distribution algorithm, hierarchical clustering, and any suitable algorithm that automatically discovers natural grouping of data. Cluster algorithm 310 may be software or a process that resides on memory 240 in node 200 as part of application monitoring process 248. In other embodiments, processor 220 may have on-board clustering algorithms that allow for the processing of data without software in memory.

Cluster set 305 represents a plurality of data 320 that has been processed according to algorithm 310. Cluster set 305 may be stored in memory 240 as any type of data structures, such as lists, linked lists, arrays, abstract lists, or any other suitable data structure for storing a plurality of data 320. In some embodiments, cluster set 305 also stores information regarding each node 200 and application 247 that corresponds to each data 320. In some embodiments, cluster set 305 also stores the current security policy (if any) that is applied to application 247 and node 200 that corresponds to each data 320 in cluster set 305.

As shown in FIG. 3 and as an exemplary embodiment, each data 320(1)-(N) represents at least the following two features of nodes 200 in computer network 100: (1) the Number of Connections to outside IP addresses (as represented on the Y axis in FIG. 3) and (2) Application Library Data (as represented on the X axis in FIG. 3). As shown in FIG. 3, data 320(1)-(N) is processed by cluster algorithm 310. Processing data 320(1)-(N) results in cluster sets 305(1), 305(2), 305(3), and 305(4). Each cluster set 305 contains data 320 that is grouped together because that data 320 has more similarity according to cluster algorithm 310 than other data 320 in the schematic diagram 300.

Modifications, additions, or omissions may be made to schematic diagram 300 without departing from the scope of the disclosure. For example, in certain embodiments schematic diagram 300 may be displayed to an end user of node 200. In these embodiments, node 200 also comprises a display communicatively coupled to processor 220 and a GUI generator software process that, when executed by processor(s) 220, causes processor 220 to transmit signals to the display that when received by the display cause it to present a graphical representation of the application cluster algorithm 310 as disclosed and shown in FIGS. 3 and 4. The display is any device or component that is suitable to present a GUI to an end user. The display may include devices such as TVs, monitors, smart phones, computers, laptops, and other similar devices. The end user of the display may be able to select each cluster set 305 in order to add a security policy to each cluster set 305. In some embodiments, the end user of the display may be able to change the cluster algorithm 310 by selecting a different cluster algorithm from a list or presentation of cluster algorithms. In certain embodiments, the display may include a touch screen to allow the user to interact with schematic diagram 300 by touch. As another example, in certain embodiments, schematic diagram 300 may not be shown at all and may be performed as a process on node 200 without creating any graphical representation of the processing of the data.

Figure 4:
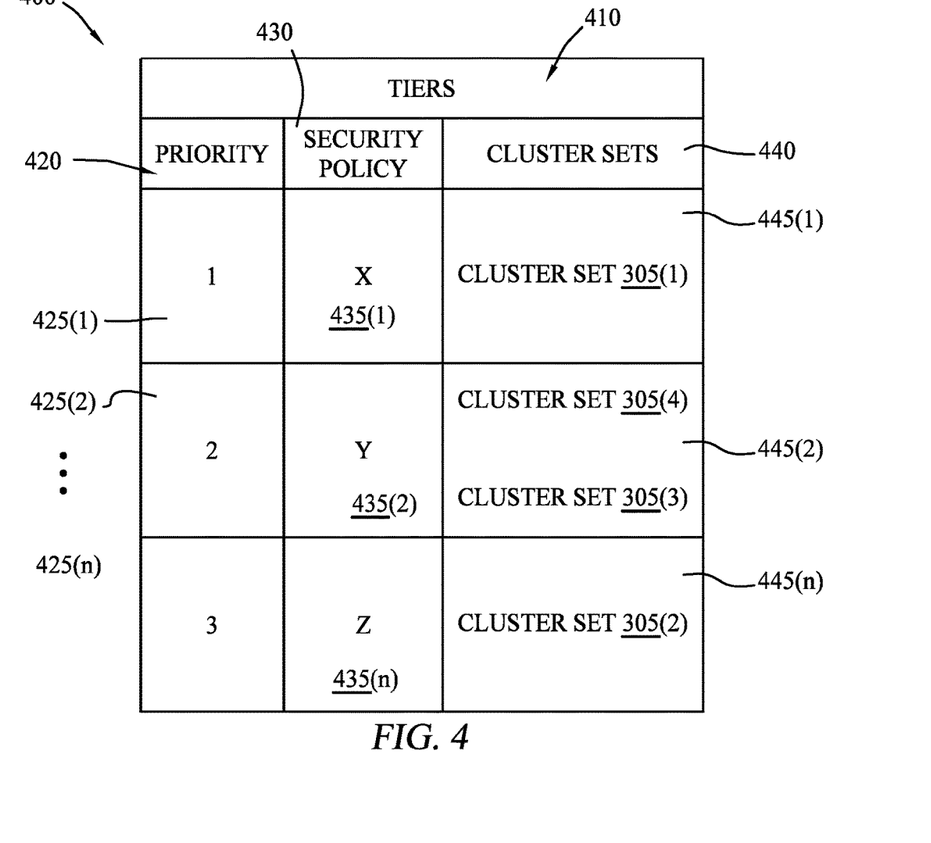
FIG. 4 is a schematic diagram illustratively depicting generating a hierarchy of the cluster sets by grouping the cluster sets into tiers, according to one embodiment of the present disclosure.

FIG. 4 is a schematic diagram 400 illustratively depicting generating a hierarchy of cluster sets by grouping cluster sets into tiers, according to one embodiment of the present disclosure. In the illustrated embodiment, schematic diagram 400 comprises a cluster set tiers table 410. Cluster set tiers table 410 comprises a priority column 420, a security policy column 430, and a cluster sets column 440. Priority column 420 comprises priority cells 425(1)-(n). Security policy column 430 comprises security policy cells 435(1)-(n), and cluster sets column 440 comprises cluster set cells 445(1)-(n). Cluster set cells 445(1)-(n) comprise cluster sets 305(1)-(n). In certain embodiments, schematic diagram 400 represents software or a process that can run on node 200 in computer network 100.

Cluster set tiers table 410 represents any suitable table that is maintained by node 200 in computer network 100 that can be used to generate a hierarchy of cluster sets 305 after they have been processed by application monitoring process 248 when executed by processor 220. Cluster set tiers table 410 may include any number of rows columns. In some embodiments, cluster set tiers table 410 does not need to be a table at all and may be any data structure suitable for generating a hierarchy of cluster sets 305 based on security policies 435 and priority cells 425.

Priority cells 425 represent any suitable data type that indicates the priority for a given security policy 435 that a security operations team may handle. Priority cells 425 may also represent any suitable data type indicating the level of security vulnerability for a given security policy 435. Priority cells 425 may include integer values, string words, and any other data type that may convey the priority of a given security policy 435. As illustrated in FIG. 4, security policy 435 with the value "X" has the priority of 1, and priority of 1 may be the highest priority that a security operations team may need to evaluate. A security operations team may be any suitable person or persons, including development teams and management.

Priority column 420 represents any suitable list or array of priority cells 425(1)-(n) that correspond to security policy 435 and may correspond to one or more cluster sets 305. Priority column 420 may list the priority cells 425(1)-(n) in any order including ascending, descending, alphabetical, and random. In some embodiments, an end user of node 200 in computer network 100 may be able to select and sort the priority as they desire.

Security policy 435 represents any suitable data type suitable to represent a current security policy that is applied to or a security policy that is set to be applied to one or more cluster sets 305 in the same row of cluster set tiers table 410. Security policy 435 may include integer values, strings, and any other data type that can represent a security policy. Security policy 435 represents any suitable set of instructions that allows an application to determine, before performing a possibly unsafe or sensitive operation, what the operation is and whether it is being attempted in context that allows the operation to be performed according to the set of instructions. Security policy 435 may include policies that are operable to work with JAVA security manager, OPEN POLICY AGENT, CISCO KUBERNETES, CISCO Gate-Keeper, or any other security manager for various programming languages, networks, or systems. For example, the JAVA programming language comprises a class called a security manager that is an object that defines a security policy for an application. The security policy as implemented in JAVA specifies to the application which actions are unsafe or sensitive. According to the JAVA security manager, any actions not allowed by the security policy create an exception.

Security policy column 430 represents any suitable list or array of security policies 435(1)-(n) that correspond to priority cells 425 and may correspond to one or more cluster sets 305. Security policy column 430 may list the security policies 435(1)-(n) in any order including ascending, descending, alphabetical, and random. In some embodiments, an end user of node 200 in computer network 100 may be able to select and sort the priority as they desire.

Cluster set cell 445 represents any suitable data type that represents one or more cluster sets 305. Cluster set cell 445 may comprise multiple cluster sets 305 or may comprise no cluster sets. In certain embodiments, cluster sets 305 may be added or removed from cluster set cell 445 depending on the results of the clustering algorithm process as shown in FIG. 3 or according to any of the embodiments in this disclosure.

Cluster set column 440 represents any suitable list or array of cluster set cells 445(1)-(n) that correspond to priority cells 425 and security policy 435. Security policy column 430 may list cluster set cells 445(1)-(n) in any order including ascending, descending, alphabetical, and random. In some embodiments, an end user of node 200 in computer network 100 may be able to select and sort the cluster set cells as they desire.

In an exemplary embodiment of operation, application monitoring process 248 may further group cluster sets 305 into tiers as shown in FIG. 4. After generating cluster set 305 according to the disclosures of embodiments shown in FIG. 3, application monitoring process 248 may collect or receive data indicating whether the nodes or applications whose features are represented by the data in one of the cluster sets 305 has a current security policy 435 applied to it. Based on the current security policy applied to the application or applications who are represented by a cluster set, application monitoring process 248 may generate a cluster set tiers table 410. If the applications in a cluster set 305(1) have a specific security policy that matches a predefined security policy 435(1) (shown as "X" in the cluster set tiers table 410), then application monitoring process 248 will add cluster set 305(1) to cluster set cell 445(1). Accordingly, as shown in FIG. 4, cluster set 305(1) will be given a priority 424(1) of "1" which may correspond to a high-level security vulnerability that needs to be addressed by a security operations team as soon as possible. In some embodiments, the security operations team will be able to automatically or manually apply security policy 435(1) to each application that is running in a cluster set 305(1). This process may repeat until every cluster set 305 is added to a cluster set cell 445.

Modifications, additions, or omissions may be made to schematic diagram 400 without departing from the scope of the disclosure. For example, tiers may be categorized into shopping applications, bandwidth applications, etc. with various verifications. As another example, each tier may access certain resources (such as database servers and/or other nodes). As another example, in certain embodiments schematic diagram 400 may be shown to an end user of node 200. In these embodiments, node 200 also comprises a display communicatively coupled to processor 220 and a GUI generator software process that, when executed by processor(s) 220, causes processor 220 to transmit signals to the display that when received by the display cause it to present a graphical representation of the application clustering algorithm as disclosed and shown in FIGS. 3 and 4. The display is any device or component that is suitable to present a GUI to an end user. The display may include devices such as TVs, monitors, smart phones, computers, laptops, and other similar devices. The end user of the display may be able to select each cluster set 305 in order to add a security policy to each cluster set 305. In some embodiments, the end user of the display may be able to apply multiple security policies to multiple cluster sets. In certain embodiments, the display may include a touch screen to allow for the user to interact with schematic diagram 400 by touch. As another example, in certain embodiments, schematic diagram 400 may not be shown at all and may be performed as a process on node 200 without creating any graphical representation of the processing of the data.

Figure 5:
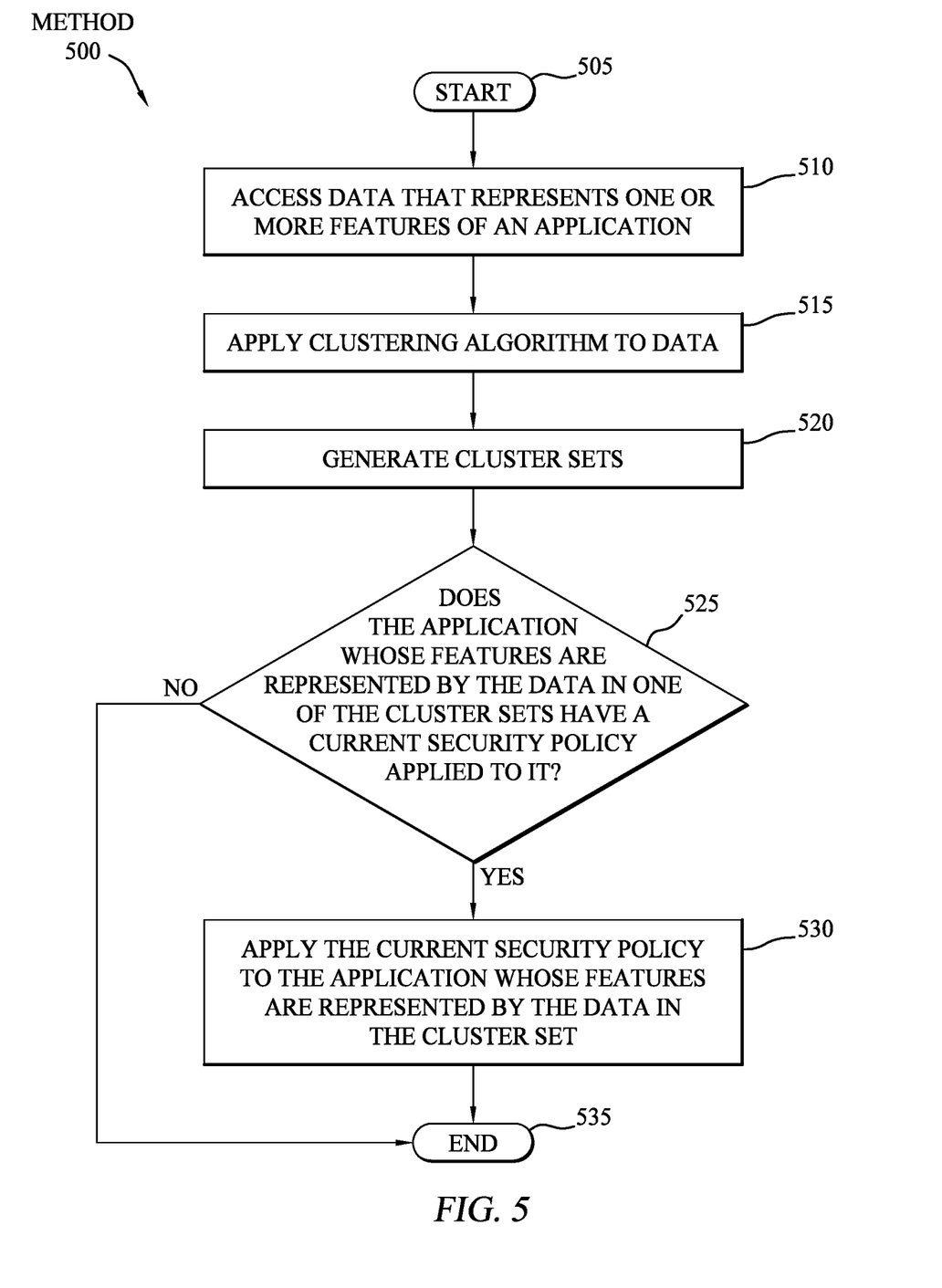
FIG. 5 illustrates an example method for clustering applications based on included libraries and observed events, according to some embodiments of the present disclosure.

FIG. 5 illustrates an example method for clustering applications based on included libraries and observed events and then applying a security policy, according to some embodiments of the present disclosure.

At step 505, method 500 begins. In certain embodiments, processor 220 executes application monitoring process 248 to begin method 500.

At step 510, application monitoring process 248 receives or collects data 320 from agents 244 on nodes 200 in computer network 100. For example, data 320 may comprise application library data, events data, and current security policies.

At step 515, application monitoring process 248 applies cluster algorithm 310 to data 320. For example, cluster algorithm 310 may include K-means clustering algorithm, means-shift clustering algorithm, a density-based spatial clustering algorithm, centroid-based clustering algorithm, distribution-based clustering algorithms such as gaussian distribution algorithm, hierarchical clustering, and any suitable algorithm that automatically discovers natural grouping of data.

At step 520, application monitoring process 248 uses the results of applying cluster algorithm 310 to data 320 to generate one or more cluster sets 305. In certain embodiments, cluster sets 305 are then stored in memory 240.

At step 525, application monitoring process 248 determines whether application 247, whose features (such as included application libraries and observed events) are represented by data 320 in one of cluster sets 305, has a current security policy 435 applied to it. If application monitoring process 248 determines that application 247 has a current security policy 435 applied to it, application monitoring process 248 may store the current security policy 435 in memory 240 and then application monitoring process 248 proceeds to step 530. If application monitoring process 248 determines that application 247 does not have a current security policy 435, then application monitoring process 248 proceeds to step 535 where the method ends.

At step 530, application monitoring process 248 applies the current security policy 435 that was determined in step 525 to applications 247 whose features are represented by data 320 in one of the cluster sets. For example, for a JAVA application, monitoring process 248 may apply the current security policy 435 that was determined in step 655 using the System.setProperty("java.security.policy", "file:currentSecurity.policy") method. The method ends at step 535.

Various embodiments may perform some, all, or none of the steps described above. For example, certain embodiments may omit step 530 under certain conditions. Furthermore, certain embodiments may perform these steps in a different order or in parallel. Moreover, one or more steps may be repeated. For example, step 525 may be repeated for any number of different cluster sets 305. While discussed as application monitoring process 248 performing these steps, any suitable component of computer network 100 may perform one or more steps of the method.

Figure 6:
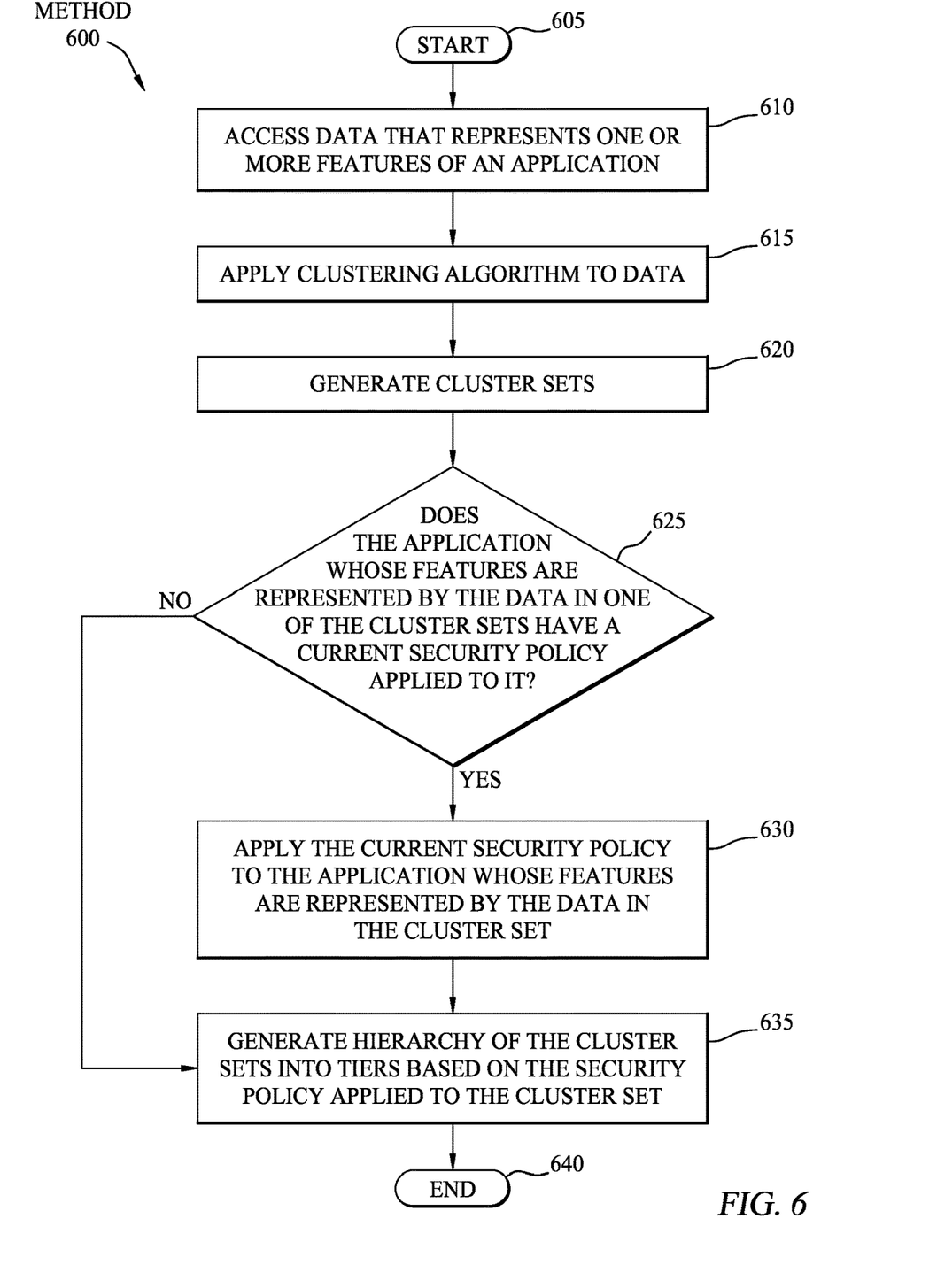
FIG. 6 illustrates an example method for clustering applications based on included libraries and observed events, according to some embodiments of the present disclosure.

FIG. 6 illustrates an example method for clustering applications based on included libraries and observed events, applying a security policy, and then grouping into tiers, according to some embodiments of the present disclosure.

At step 605, method 600 begins. In certain embodiments, processor 220 executes application monitoring process 248 to begin method 600.

At step 610, application monitoring process 248 receives or collects data 320 from agents 244 on nodes 200 in computer network 100. For example, data 320 may comprise application library data, events data, and current security policies.

At step 615, application monitoring process 248 applies cluster algorithm 310 to data 320. For example, cluster algorithm 310 may include K-means clustering algorithm, means-shift clustering algorithm, a density-based spatial clustering algorithm, centroid-based clustering algorithm, distribution-based clustering algorithms such as gaussian distribution algorithm, hierarchical clustering, and any suitable algorithm that automatically discovers natural grouping of data.

At step 620, application monitoring process 248 uses the results of applying cluster algorithm 310 to data 320 to generate one or more cluster sets 305. In certain embodiments, cluster sets 305 are then stored in memory 240.

At step 625, application monitoring process 248 determines whether the application 247, whose features (such as included application libraries and observed events) are represented by data 320 in one of cluster sets 305, have a current security policy 435 applied to it. If application monitoring process 248 determines that application 247 has a current security policy 435 applied to it, application monitoring process 248 may store the current security policy 435 in memory 240 and then application monitoring process 248 proceeds to step 630. If the application monitoring process determines that the application 247 does not have a current security policy, then application monitoring process 248 proceeds to step 635. In other embodiments, if the application monitoring process 248, determines that the application 247 does not have a current security policy 435, then application monitoring process 248 proceeds to step 640.

At step 630, application monitoring process 248 applies the current security policy 435 that was determined in step 625 to applications 247 whose features are represented by data 320 in one of the cluster sets. For example, for a JAVA application, monitoring process 248 may apply the current security policy that was determined in step 625 by using the System.setProperty("java.security.policy", "file:currentSecurity.policy") method. In some embodiments, step 630 is repeated for each application in a cluster set. Once completed step 630 proceeds to step 635

At step 635, application monitoring process 248 generates a hierarchy of the cluster sets by grouping the cluster sets into tiers based on the security policy applied to the cluster set. For example, application monitoring process 248 may further group cluster sets 305 into tiers as shown in FIG. 4. After generating cluster set 305 according to the disclosures of embodiments shown in FIG. 3, application monitoring process 248 may collect or receive data indicating whether the nodes or applications whose features are represented by the data in one of the cluster sets 305 has a current security policy 435 applied to it. Based on the current security policy applied to the application or applications who are represented by a cluster set, application monitoring process 248 will generate a cluster set tiers table 410. If the applications in a cluster set 305(1) have a specific security policy that matches a predefined security policy 435(1) (shown as "X" in the cluster set tiers table 410), then application monitoring process 248 will add cluster set 305(1) to cluster set cell 445(1). Accordingly, as shown in FIG. 4, cluster set 305(1) will be given a priority 424(1) of "1" which may correspond to a high-level security vulnerability that needs to be addressed by a security operations team as soon as possible. In some embodiments, the security operations team will be able to automatically or manually apply security policy 435(1) to each application that is running in a cluster set 305(1). This process may repeat until every cluster set 305 is added to a cluster set cell 445. Step 635 then proceeds to finish at step 640. In some embodiments, the method proceeds to step 605 to repeat the steps over again.

Various embodiments may perform some, all, or none of the steps described above. For example, certain embodiments may omit steps 630 under certain conditions. Furthermore, certain embodiments may perform these steps in a different order or in parallel. Moreover, one or more steps may be repeated. For example, step 625 may be repeated for any number of different cluster sets. While discussed as application monitoring process 248 performing these steps, any suitable component of computer network 100 may perform one or more steps of the method.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
one or more processors; and one or more computer-readable non-transitory storage media comprising instructions that, when executed by the one or more processors, cause one or more components of the system to perform operations comprising:
accessing data that represents one or more features of an application, wherein the application is running on one or more nodes in a computer network;
applying a cluster algorithm to the data to generate a plurality of cluster sets, wherein the cluster algorithm uses K-means clustering, mean-shift clustering, density-based spatial clustering, centroid-based clustering, distribution-based clustering, or hierarchical clustering;
determining a security policy to apply to a cluster set of the plurality of cluster sets;
applying the security policy to an application whose features are represented by the data in the cluster set; and generating a hierarchy of the plurality of cluster sets by grouping the plurality of cluster sets into tiers in a cluster set tiers table based on the security policy applied to the cluster set, wherein the cluster set tiers table comprises a priority column and each tier corresponds to an increasing level of security vulnerability.

2. The system of claim 1, wherein the one or more features comprise information regarding one or more of: an application library of a node; a connection to an IP address external to the computer network; a connection to an IP address internal to the computer network; and a current security policy.

3. The system of claim 1, wherein determining a security policy to apply to a cluster set further comprises determining one or more current security policies of the one or more features of the application represented by the data in the cluster set.

4. The system of claim 1, wherein an application library of the one or more nodes is communicated by an agent.

5. The system of claim 1, wherein an application library of the one or more nodes is called by a first application on a node.

6. A method, comprising: accessing data that represents one or more features of an application, wherein the application is running on one or more nodes in a computer network; applying a clustering algorithm to the data to generate a plurality of cluster sets, wherein the cluster algorithm uses K-means clustering, mean-shift clustering, density-based spatial clustering, centroid-based clustering, distribution-based clustering, or hierarchical clustering; determining a security policy to apply to a cluster set of the plurality of cluster sets; applying the security policy to an application whose features are represented by the data in the cluster set; and generating a hierarchy of the plurality of cluster sets by grouping the plurality of cluster sets into tiers in a cluster set tiers table based on the security policy applied to the cluster set, wherein the cluster set tiers table comprises a priority column and each tier corresponds to an increasing level of security vulnerability.

7. The method of claim 6, wherein the one or more features comprise information regarding one or more of: an application library of a node; a connection to an IP address external to the computer network; a connection to an IP address internal to the computer network; and a current security policy.

8. The method of claim 6, wherein determining a security policy to apply to a cluster set further comprises determining one or more current security policies of the one or more features of the application represented by the data in the cluster set.

9. The method of claim 6, wherein an application library of the one or more nodes is communicated by an agent.

10. The method of claim 6, wherein an application library of the one or more nodes is called by a first application on a node.

11. One or more computer-readable non-transitory storage media embodying instructions that, when executed by a processor, cause the processor to perform operations comprising: accessing data that represents one or more features of an application, wherein the application is running on one or more nodes in a computer network; applying a clustering algorithm to the data to generate a plurality of cluster sets, wherein the cluster algorithm uses K-means clustering, mean-shift clustering, density-based spatial clustering, centroid-based clustering, distribution-based clustering, or hierarchical clustering; determining a security policy to apply to a cluster set of the plurality of cluster sets; applying the security policy to an application whose features are represented by the data in the cluster set; and generating a hierarchy of the plurality of cluster sets by grouping the plurality of cluster sets into tiers in a cluster set tiers table based on the security policy applied to the cluster set, wherein the cluster set tiers table comprises a priority column and each tier corresponds to an increasing level of security vulnerability.

12. The one or more computer-readable non-transitory storage media of claim 11, wherein the one or more features comprise information regarding one or more of: an application library of a node; a connection to an IP address external to the computer network; a connection to an IP address internal to the computer network; and a current security policy.

13. The one or more computer-readable non-transitory storage media of claim 11, wherein determining a security policy to apply to a cluster set further comprises determining one or more current security policies of the one or more features of the application represented by the data in the cluster set.

14. The one or more computer-readable non-transitory storage media of claim 11, wherein an application library of the one or more nodes is communicated by an agent.

* * * * *